(12) United States Patent
Géhberger et al.

(10) Patent No.: US 11,003,506 B2
(45) Date of Patent: May 11, 2021

(54) TECHNIQUE FOR DETERMINING A LOAD OF AN APPLICATION

(71) Applicant: Telefonaktiebolaget LM Ericsson (publ), Stockholm (SE)

(72) Inventors: Dániel Géhberger, Budapest (HU); Péter Mátray, Budapest (HU); Gábor Németh, Budapes (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 178 days.

(21) Appl. No.: 16/067,965

(22) PCT Filed: Jan. 26, 2016

(86) PCT No.: PCT/EP2016/051518
§ 371 (c)(1),
(2) Date: Jul. 3, 2018

(87) PCT Pub. No.: WO2017/129228
PCT Pub. Date: Aug. 3, 2017

(65) Prior Publication Data
US 2019/0347139 A1   Nov. 14, 2019

(51) Int. Cl.
*G06F 9/50* (2006.01)
*G06F 9/54* (2006.01)
(Continued)

(52) U.S. Cl.
CPC .......... *G06F 9/5083* (2013.01); *G06F 9/546* (2013.01); *H04L 47/6255* (2013.01); *H04L 67/10* (2013.01); *G06F 2209/548* (2013.01)

(58) Field of Classification Search
CPC .................................................. G06F 9/5083
See application file for complete search history.

(56) References Cited

U.S. PATENT DOCUMENTS

2003/0081552 A1* 5/2003 Goetzinger ......... H04L 47/2441
370/235
2006/0212873 A1   9/2006 Takahisa
(Continued)

OTHER PUBLICATIONS

Microsoft, "How to configure auto scaling for a Cloud Service in the portal, Automatisk skala en molntjänst i portalen", Micorsoft Azure, online blog, May 8, 2017, pp. 1-6, obtained on Dec. 19, 2018, obtained from Internet: https://docs.microsoft.com/sv-se/azure/cloud-services/cloud-services-how-to-scale-portal.

(Continued)

*Primary Examiner* — Sisley N Kim
(74) *Attorney, Agent, or Firm* — Patent Portfolio Builders, PLLC (57) ABSTRACT

A technique for determining of a load of an application in a cloud computing environment is disclosed. The application is executed with one or more application instances in the cloud computing environment, wherein each of the one or more application instances obtains input data from a respective input queue. A method implementation for supporting the technique comprises determining a wait indicator for at least one of the one or more application instances, the wait indicator for an application instance indicating a relation between empty states of the input queue of the application instance and non-empty states of the input queue of the application instance, and triggering forwarding of the wait indicator determined for the at least one of the one or more application instances to a load determination component.

16 Claims, 9 Drawing Sheets

(51) Int. Cl.
  *H04L 12/863*  (2013.01)
  *H04L 29/08*  (2006.01)

(56) References Cited

U.S. PATENT DOCUMENTS

2009/0034846 A1* 2/2009 Senior ................ G06K 9/00778
  382/190
2013/0039178 A1* 2/2013 Chen ..................... H04L 47/22
  370/230.1
2014/0047090 A1* 2/2014 Livne ................. H04L 65/1063
  709/223

OTHER PUBLICATIONS

Google Cloud, "Scaling Based on CPU or Load Balancing Serving Capacity", Google Cloud, pp. 1-6, obtained on Dec. 19, 2018, obtained from Internet: https://cloud.google.com/compute/docs/autoscaler/scaling-cpu-load-balancing.

Amazon, "Scaling Based on Amazon SQS—Amazon EC2 Auto Scaling", Amazon Web Services, Inc., pp. 1-6, obtained on Dec. 19, 2018, obtained from internet: https://docs.aws.amazon.com/autoscaling/ec2/userguide/as-using-sqs-queue.html.

Office Action issued in corresponding EP Application No. 16702504.8 dated Mar. 23, 2020, 06 Pages. The references not cited herein have previously been made of record.

* cited by examiner

TECHNIQUE FOR DETERMINING A LOAD OF AN APPLICATION

CROSS-REFERENCE TO RELATED APPLICATION

This application is a U.S. National Stage Filing under 35 U.S.C. § 371 of International Application No. PCT/EP2016/051518, filed on Jan. 26, 2016, the disclosure of which is fully incorporated herein by reference.

TECHNICAL FIELD

The present disclosure generally relates to cloud computing. In particular, a technique for determining a load of an application in a cloud computing environment is presented. The technique may be embodied in methods, computer programs, apparatuses and systems.

BACKGROUND

In recent years, cloud computing systems have become increasingly widespread. In such systems, the processing components may form part of a processing chain, wherein a respective component processes an input and forwards the processed input to the next component in the chain. In case of service chaining of virtualized network functions, for example, every component in the chain may perform some processing on incoming data packets and forward the data packets to the next component in the chain. The situation is similar in big data systems working on stream processing or in systems comprising multiple applications connected via message queues where streams are processed in multiple steps.

In order to deal with fluctuations of incoming data, the processing components typically maintain input queues. These queues can be found at various levels of the systems and may include, for example, packet buffers of network interfaces, Transmission Control Protocol (TCP) buffers, message queues, application level queues, or the like.

The actual processing of the incoming data may be performed by multiple parallel instances of an application. Each application instance may have its associated input queue, and a load balancer may be used to distribute incoming data to the respective input queues. The number of application instances required for processing generally depends on the actual input rate of the incoming data and, since this rate may change over time, the application may be scaled out or scaled in according to the changing requirements, i.e., the number of application instances performing input processing may be increased (so-called "scale out") or the number of application instances may be decreased (so-called "scale in"). In case of an online store, for example, the number of web server instances may be increased in peak selling times to be able to handle the increased number of requests and may be decreased again when the request rate drops back to a normal level.

In today's cloud computing systems, several types of basic metrics have been proposed for determining the load of an application and scaling the number of running application instances accordingly. In practice, the Control Processing Unit (CPU) utilization of virtual machines executed in such a system is most widely used as a metric that generally works well for simple web applications. This metric cannot be adopted for more advanced cases, however. For example, packet processing applications working with fast packet processing frameworks typically use polling techniques to achieve highest possible data rates but, since such polling of input queues results in a constant 100% CPU load even when there is nothing to process, a CPU utilization based metric is not suitable for these types of applications. As another example, telecom applications that perform stream enrichment, i.e., read data from an input stream and look up corresponding states from in-memory databases, are rather network I/O bound while constantly leaving CPU utilization at lower levels. These applications are difficult to scale using CPU utilization thresholds as well.

Another commonly used approach for scaling the number of running application instances is based on the capacity that one instance can handle. Since this value is defined by the application developer, however, this approach is only suitable for simple applications, such as typical web services, where each input results in an approximately similar resource load.

In another scaling approach, it is known to take into consideration the actual length of the input queues of the application instances as an indication of the load of the application. However, since a system typically comprises different types of queues with different abstractions, Application Programming Interfaces (APIs), sizes, granularities and other special characteristics, it is difficult to create a generally applicable metric, like the CPU utilization mentioned above. Further, not all buffer and queue implementations provide APIs for querying the actual lengths of the buffers and queues, which particularly applies to hardware level queues. Also, even if it is possible to query the length of the queue, it may be resource intensive and it may require multiple system calls.

SUMMARY

Accordingly, there is a need for a technique for determining a load of an application that avoids one or more of the problems discussed above, or other problems.

According to a first aspect, a method for supporting determination of a load of an application in a cloud computing environment is provided. The application is executed with one or more application instances in the cloud computing environment, wherein each of the one or more application instances obtains input data from a respective input queue. The method comprises determining a wait indicator for at least one of the one or more application instances, the wait indicator for an application instance indicating a relation between empty states of the input queue of the application instance and non-empty states of the input queue of the application instance, and triggering forwarding of the wait indicator determined for the at least one of the one or more application instances to a load determination component.

The application may be a computer program that is executed in the cloud computing environment and may generally be configured to process input data. For scalability purposes, the application may be executed through one or more application instances so that the application may be scaled out (i.e., the number of application instances is increased) or scaled in (i.e., the number of application instances is decreased), depending on the current load (i.e., workload) the application has to handle. The load of the application may depend on the rate of input data (i.e., the amount of input data per unit of time) that is to be processed. Each application instance may obtain a portion of the input data from its associated input queue, wherein a load balancer may be used to distribute the input data that is to be processed by the application to the respective input queues of the application instances.

The wait indicator for an application instance may be used as a metric for indicating the current load (i.e., workload) of the application instance. By determining the wait indicator as a relation between empty states of the input queue of the application instance and non-empty states of the input queue of the application instance, the wait indicator may be a measure that indicates a relation between the waiting times of the application instance (i.e., times at which the application instance waits for input data to be processed because the input queue is empty) and busy times of the application instance (i.e., times at which the application instance is processing input data because the input queue is non-empty). An input queue of an application instance may be said to be in an empty state when the input queue does not contain any input data elements and may be said to be in a non-empty state when the input queue contains one or more input data elements. In general, a low wait indicator value may indicate that the application instance obtains input data from the input queue most of the times so that the load of the application instance is high. A high wait indicator value, on the other hand, may indicate that the application instance frequently waits for input data so that the load of the application instance is low.

In one implementation, the wait indicator for an application instance may indicate a ratio (or more generally a relation) between times at which the input queue of the application instance is in an empty state and times at which the input queue of the application instance is in a non-empty state. The wait indicator may thus be said to indicate a portion of times at which the application instance is waiting for input data. The "times" referred to herein may relate to the overall time periods at which the input queue is in an empty/non-empty state or relate to the number times a dequeuing operation is performed on the input queue at which the input queue is in an empty/non-empty state. A dequeuing operation generally removes and returns an input data element from the beginning of the input queue. A dequeuing operation may be said to fail when the input queue is in an empty state and to succeed when the input queue is in a non-empty state.

In one particular implementation, determining the wait indicator for an application instance may include incrementing a wait counter each time a dequeuing operation performed on the input queue of the application instance fails because the input queue of the application instance is in an empty state, and incrementing an input counter each time a dequeuing operation performed on the input queue of the application instance succeeds because the input queue of the application instance is in a non-empty state, wherein the wait indicator for the application instance indicates a ratio (or more generally a relation) between the wait counter and the input counter. For example, the wait indicator for the application instance may be defined as the wait counter divided by the input counter (i.e., wait counter/input counter).

Determining the wait indicator for an application instance may be performed by the application instance itself. In this case, the application instance may perform the dequeuing operations itself in order to obtain input data from its associated input queue. In another implementation, the application instance may obtain the input data from its input queue via an interface component so that determining the wait indicator for the application instance may be performed by the interface component.

The interface component may be provided by a middle layer of the cloud computing environment, for example, by a messaging library or a TCP socket implementation, depending on the type of the input queue. The application instance may call an API of the interface component to obtain input data from the input queue associated with the application instance, wherein the actual dequeuing operation may be performed by the interface component.

In order to determine the load of the application as a whole (i.e., not only the load of single application instances), the wait indicators determined for the at least one of the one or more application instances may be forwarded to a load determination component. The load determination component may determine the load of the application based on the received wait indicators and optionally consider the determined load for a decision on scaling the application. The load determination component may be an orchestration component of the cloud computing environment, for example.

If determining the wait indicator for an application instance is performed by the application instance itself, forwarding the wait indicator to the load determination component may be performed by the application instance as well. If determining the wait indicator for the application instance is performed by an interface component, forwarding the wait indicator to the load determination component may be performed by the interface component.

Forwarding the wait indicator to the load determination component may be performed periodically (e.g., every second). When wait counters and input counters are used, as explained above, the wait and input counters may be set back to 0 each time the wait indicator is forwarded. If determining the wait indicator for an application instance is performed by the application instance itself, the value of the input counter may be saved each time the wait indicator is forwarded and the wait indicator may be calculated accordingly as: wait counter/(input counter−last input counter).

According to a second aspect, a method for determining a load of an application in a cloud computing environment is provided. The application is executed with one or more application instances in the cloud computing environment, wherein each of the one or more application instances obtains input data from a respective input queue. The method comprises receiving a wait indicator for each of the one or more application instances, the wait indicator for an application instance indicating a relation between empty states of the input queue of the application instance and non-empty states of the input queue of the application instance, and determining the load of the application based on the received wait indicators for the one or more application instances.

The method according to the second aspect defines a method from the load determination component's perspective which may be complementary to the method according to the first aspect. As such, those aspects described with regard to the method of the first aspect which are applicable to the method of the second aspect may be comprised by the method of the second aspect as well.

As in the method of the first aspect, the wait indicator for an application instance may indicate a ratio between times at which the input queue of the application instance is in an empty state and times at which the input queue of the application instance is in a non-empty state.

The received wait indicators may be used to determine the load of the application in various ways. In one implementation, determining the load of the application may include aggregating the wait indicators for the one or more application instances to form an aggregated wait indicator, wherein the aggregated wait indicator indicates the load of the application. For example, the aggregated wait indicator may be calculated by taking an average, median, or the like, of the wait indicators for the one or more application instances. The aggregated wait indicator may be used as a metric for indicating the current load of the application.

Once determined, the load of the application may be considered in a decision on scaling the application. Accordingly, the method may further comprise scaling out or scaling in the application based on the determined load of the application. The scaling decision may be based on comparing the load of the application with a predetermined threshold. In one implementation, the application may be scaled out if the determined load of the application is greater than a first predetermined threshold and the application may be scaled in if the determined load of the application is less than a second predetermined threshold. In this case, the first predetermined threshold may be greater than the second predetermined threshold.

If the application is part of an application chain, other applications in the chain may be scaled accordingly. In one implementation, the method may thus further comprise scaling out or scaling in a subsequent application in the application chain based on the determined load of the application.

If the application is a stateful application, the one or more application instances may receive input data according to continuous data flows each. The wait indicators for the one or more application instances may in this case indicate that the distribution of the flows does not provide a substantially equal load for the application instances. Accordingly, the method may further comprise varying an allocation of input data to the input queues based on the determined load of the application so as to reach a more equal load distribution among the application instances.

According to a third aspect, a computer program product is provided. The computer program product comprises program code portions for performing the method of at least one of the first and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit for supporting determination of a load of an application in a cloud computing environment is provided. The application is executed with one or more application instances in the cloud computing environment, wherein each of the one or more application instances obtains input data from a respective input queue. The computing unit is operable to determine a wait indicator for at least one of the one or more application instances, the wait indicator for an application instance indicating a relation between empty states of the input queue of the application instance and non-empty states of the input queue of the application instance, and trigger forwarding of the wait indicator determined for the at least one of the one or more application instances to a load determination component.

According to a fifth aspect, an orchestration unit for determining a load of an application in a cloud computing environment is provided. The application is executed with one or more application instances in the cloud computing environment, wherein each of the one or more application instances obtains input data from a respective input queue. The orchestration unit is operable to receive a wait indicator for each of the one or more application instances, the wait indicator for an application instance indicating a relation between empty states of the input queue of the application instance and non-empty states of the input queue of the application instance, and determine the load of the application based on the received wait indicators for the one or more application instances.

The computing unit according to the fourth aspect and the orchestration unit according to the fifth aspect may generally be configured to perform any of the corresponding methods and method steps presented herein.

According to a sixth aspect, there is provided a system comprising at least one computing unit of the fourth aspect and an orchestration unit of the fifth aspect.

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will partially be described in connection with a cloud computing environment, it will be appreciated that the present disclosure may also be practiced in connection with any other distributed processing system.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
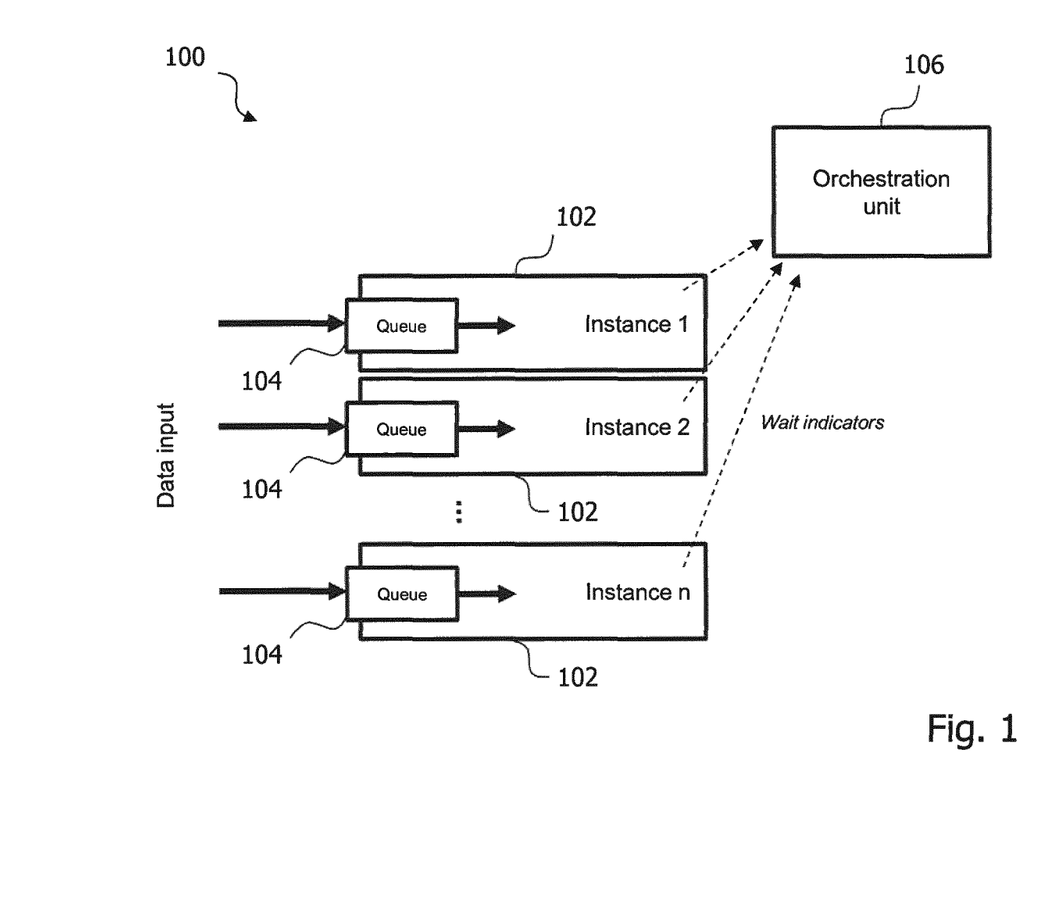
FIG. 1 schematically illustrates a plurality of application instances that obtain input data from respective input queues and that forward corresponding wait indicators to a load determination component.

FIG. 1 schematically illustrates, for a cloud computing environment 100, a plurality of application instances 102 executed in the cloud computing environment 100, the application instances 102 being instances of an application (e.g., a computer program) that is generally configured to process input data. Each application instance 102 obtains input data from a respective input queue 104 and processes the obtained input data accordingly. The application instances 102 may be executed on one or more computing units of the cloud computing environment 100 so that each computing unit executes at least one application instance 102. The application may be scaled out (i.e., the number of application instances 102 may be increased) or scaled in (i.e., the number of application instances 102 may be decreased), depending on the current load (i.e., workload) of the application. The load of the application may depend on the rate of input data (i.e., the amount of input data per unit of time) that is to be processed by the application. Each application instance 102 may obtain a portion of the overall input data to be processed by the application, wherein a load balancer may distribute the input data to the respective input queues 104 of the application instances 102.

According to the technique of the present disclosure, a wait indicator is determined for each application instance 102 and forwarded to a load determination component 106. The load determination component 106 is exemplarily illustrated as an orchestration unit of the cloud computing environment 100.

Figure 2A:
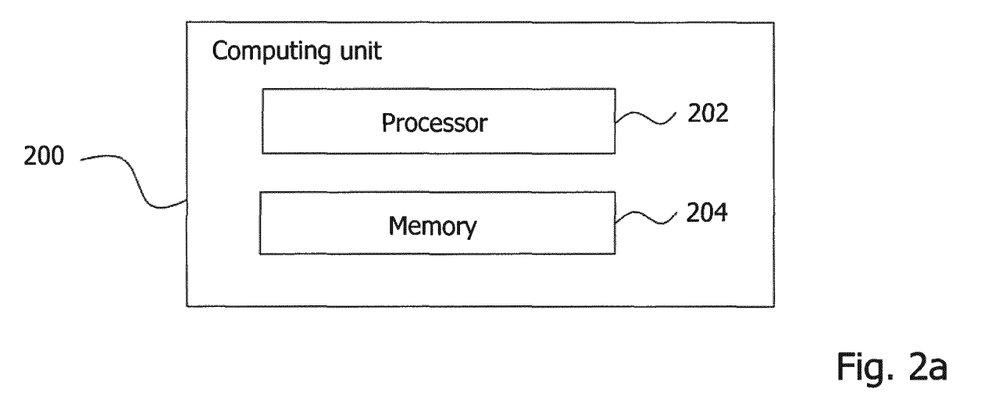
FIGS. 2a and 2b illustrate exemplary compositions of a computing unit and an orchestration unit according to the present disclosure.

FIG. 2a illustrates an exemplary composition of a computing unit 200 on which at least one of the application instances 102 may be executed. The computing unit 200 may comprise at least one processor 202 and at least one memory 204, wherein the at least one memory 204 contains instructions executable by the at least one processor 202 such that the computing unit 200 is operable to carry out the method steps described herein, particularly with reference to the application instances 102.

Figure 2B:
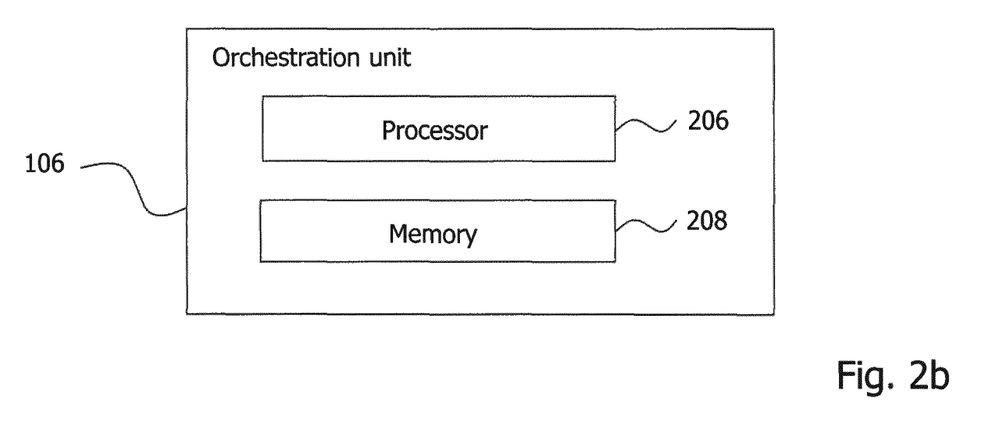

FIG. 2b illustrates an exemplary composition of the orchestration unit 106. The orchestration unit 106 may comprise at least one processor 206 and at least one memory 208, wherein the at least one memory 208 contains instructions executable by the at least one processor 206 such that the orchestration unit 106 is operable to carry out the method steps described herein.

It will be understood that, in a cloud architecture such as the cloud computing environment 100, the computing unit 200 and/or the orchestration unit 106 may be given as physical computing units, but may be given as virtualized computing units as well, such as virtual machines, for example. It will further be understood that the computing unit 200 and the orchestration unit 106 do not necessarily have to be given as separate computing units, but may be implemented as components—realized in software and/or hardware—on a single or multiple computing units (being either physical or virtual).

Figure 3A:
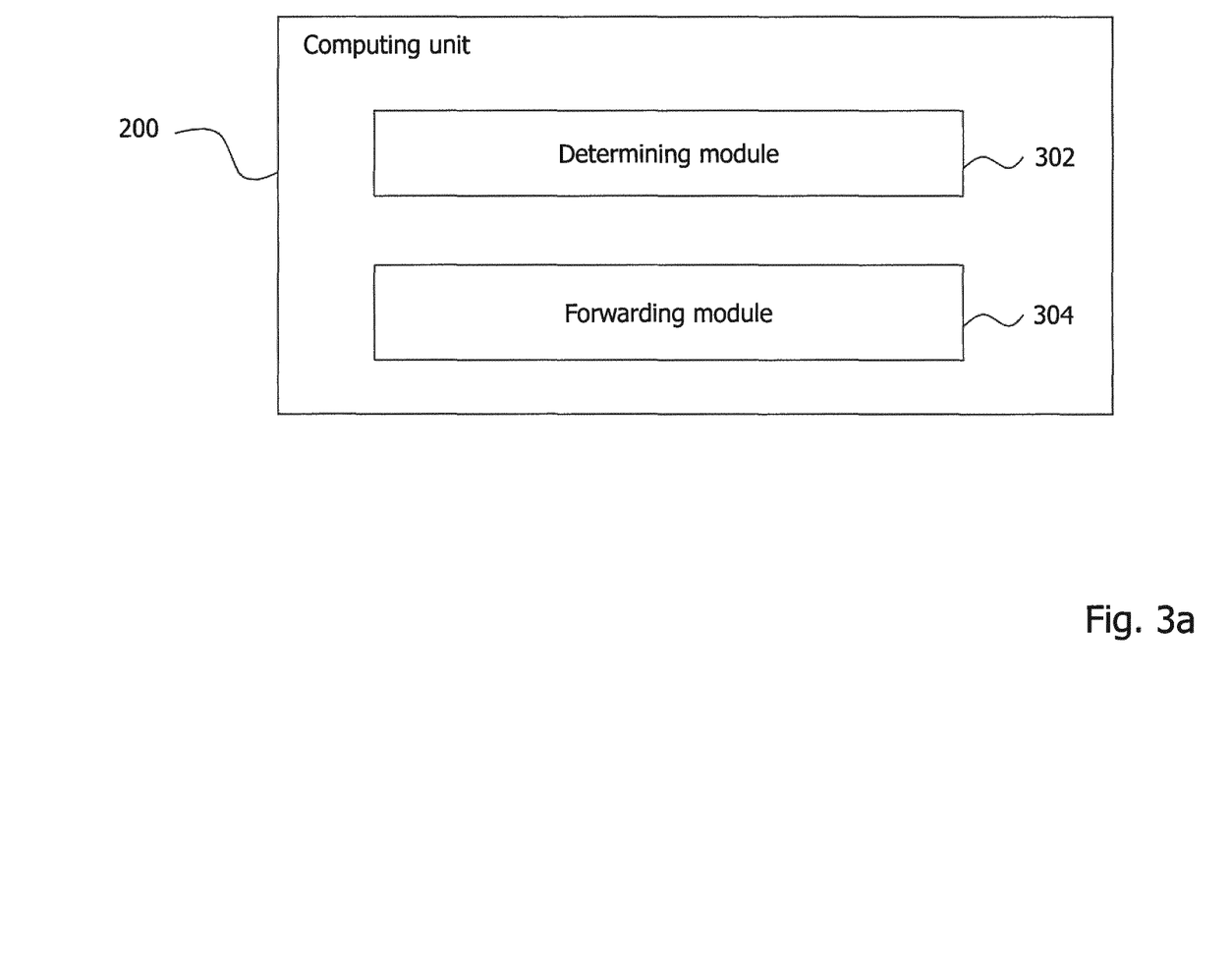
FIGS. 3a and 3b illustrate a modular composition of a computing unit and a corresponding method embodiment which may be performed by the computing unit according to the present disclosure.
Figure 3B:
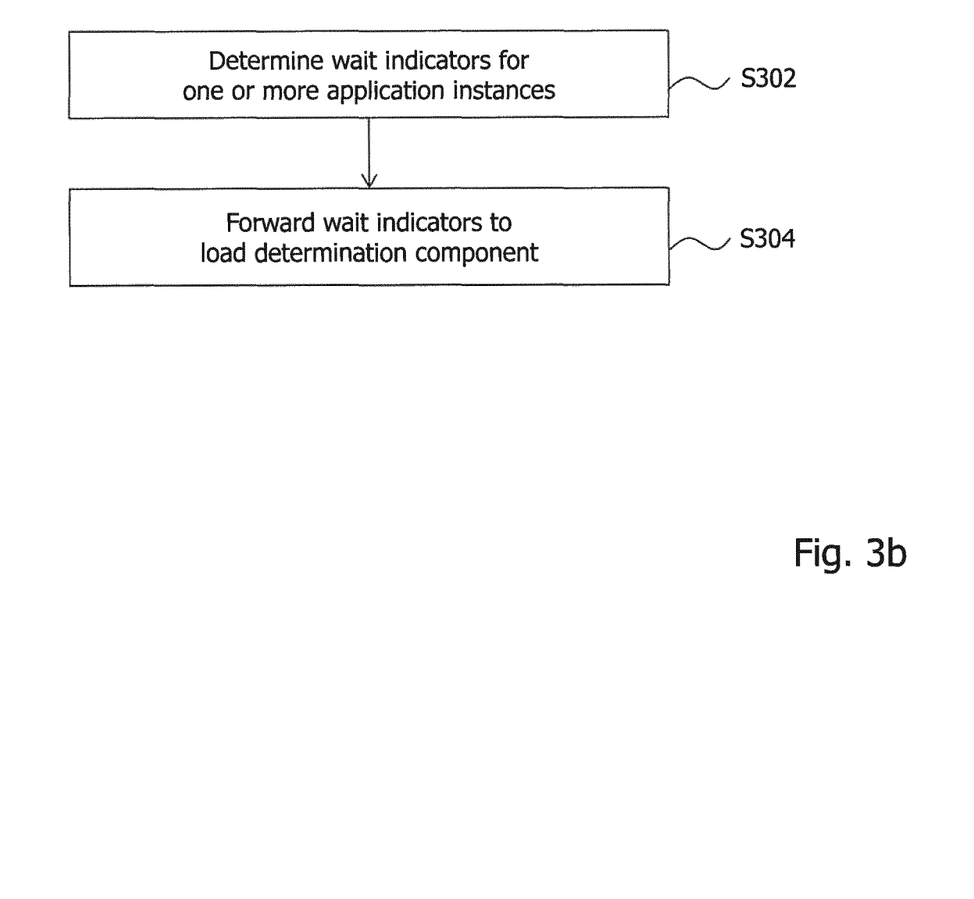

FIG. 3a schematically illustrates an exemplary modular composition of the computing unit 200 and FIG. 3b illustrates a corresponding method embodiment which may be performed by the computing unit 200 according to the present disclosure. The basic operation of the computing unit 200 will be described in the following with reference to both FIGS. 3a and 3b.

In step S302, a determining module 302 of the computing unit 200 determines a wait indicator for at least one of the application instances 102 being executed on the computing unit 200. A wait indicator for an application instance 102 may generally indicate a relation between empty states of the input queue 104 associated with the application instance 102 and non-empty states of the input queue 104 associated with the application instance 102. In step S304, the wait indicator determined for the at least one application instance 102 is forwarded to the load determination component 106. Forwarding the wait indicator to the load determination component 106 may be performed periodically (e.g., every second).

The wait indicator for an application instance 102 may be used as a metric for indicating the current load of the application instance 102. By determining the wait indicator as a relation between empty states of the input queue 104 of the application instance 102 and non-empty states of the input queue 104 of the application instance 102, the wait indicator may be a measure that indicates a relation between the waiting times of the application instance 102 (i.e., times at which the application instance 102 waits for input data to be processed because the input queue 104 is empty) and busy times of the application instance 102 (i.e., times is at which the application instance 102 is processing input data because the input queue 104 is non-empty). In general, a low wait indicator value may indicate that the application instance 102 obtains input data from its input queue 104 most of the times so that the load of the application instance 102 is high. A high wait indicator value, on the other hand, may indicate that the application instance 102 frequently waits for input so that the load of the application instance 102 is low.

The wait indicator for an application instance may indicate a ratio (or more generally a relation) between times at which the input queue of the application instance is in an empty state and times at which the input queue of the application instance is in a non-empty state. The wait indicator may thus be said to indicate a portion of times at which the application instance is waiting for input data. The "times" may relate to the overall time periods at which the input queue is in an empty/non-empty state or relate to the number times of performing dequeuing operations on the input queue at which the input queue is in an empty/non-empty state.

Figure 4:
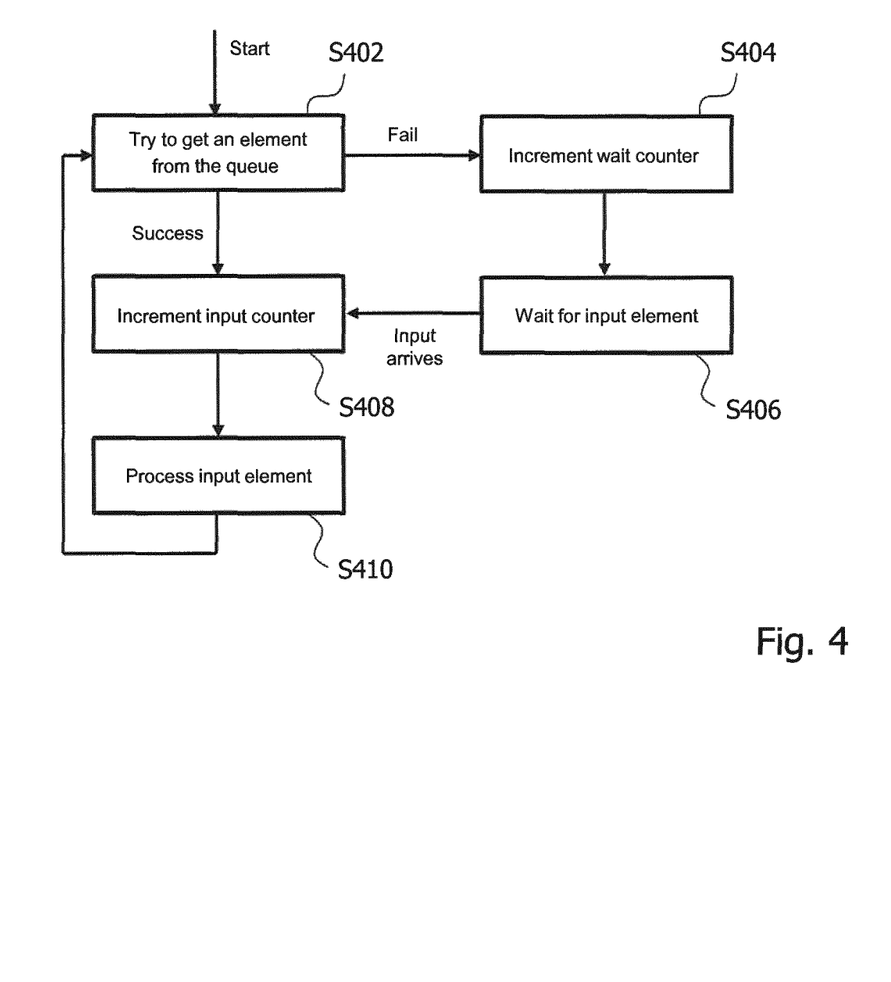
FIG. 4 illustrates a flowchart for incrementing wait and input counters as part of a method for determining a wait indicator for an application instance.

One exemplary implementation of a method of determining a wait indicator for an application instance 102 is illustrated in the flowchart shown in FIG. 4. The idea underlying this implementation is based on the fact that, while it is not generally possible to log the length of an input queue, it is always possible to track whether the queue is empty or not. Input data elements are taken from the input queue one after another, as it is the case for most typical applications, ranging from packet processors through big data systems to web shops, for example.

In the implementation, a wait counter is incremented each time a dequeuing operation performed on the input queue 104 of the application instance 102 fails because the input queue 104 is in an empty state, and an input counter is incremented each time a dequeuing operation performed on the input queue 104 of the application instance 102 succeeds because the input queue 104 is in a non-empty state.

In detail, in step S402, an attempt is made to obtain an input data element from the input queue 104 by performing a dequeuing operation on the input queue 104. If the attempt fails because the input queue 104 is in an empty state, the wait counter is incremented in step S404 and a new input data element is awaited in step S406. If the attempt in step S402 succeeds because the input queue 104 is in a non-empty state, or as soon as a new input data element awaited in step S406 arrives, the input counter is incremented in step S408 in order to track the total number of inputs. The application instance 102 may then process the input data element obtained from the input queue 104 accordingly. Once processing of the input data element is complete, a new attempt to obtain an input data element from the input queue 104 is made in step S402.

Based on the wait and input counter increments, the wait indicator for the application instance 102 may be defined as a ratio (or more generally a relation) between the wait counter and the input counter, for example, as the wait counter divided by the input counter (i.e., wait counter/input counter). When forwarding the wait indicator to the load determination component 106 is performed periodically, the wait and input counters may be set back to 0 each time the wait indicator is forwarded. This may ensure that the wait indicators are always up-to-date and overflow problems are prevented. If the wait indicator for an application instance 102 is performed by the application instance 102 itself, the value of the input counter may be saved each time the wait indicator is forwarded and the wait indicator may be calculated accordingly as: wait counter/(input counter—last input counter).

In the example of FIG. 1, the input queues 104 are illustrated as being part of the application instances 102 so that the input queues 104 may be said to be application level queues. The application instances 102 thus determine their corresponding wait indicators themselves by performing respective dequeuing operations on their own and, also, the application instances 102 forward the determined wait indicators to the load determination component 106 on their own. It will be understood, however, that the technique of the present disclosure may be practiced with other types of input queues as well, such as, for example, packet buffers of network interface cards, TCP buffers, message queues, or the like. In these (or other) cases, the application instances 102 may obtain input data from the input queues via respective interface components. An interface component may be provided by a middle layer of the cloud computing environment 100, such as, for example, a messaging library or a TCP socket implementation. An application instance may call an API of such interface component to obtain input data from the input queue associated with the application instance. The actual determination of the wait indicators (including performing respective dequeuing operations and forwarding the wait indicators to the load determination component) may in these cases be performed by the interface component. In this way, wait and input counters may be hidden from the application instances which results in zero operational overhead for the application instances.

In order to determine the load of the application as a whole (i.e., not only the load of single application instances 102), the load determination component or orchestration unit 106 may determine the load of the application based on the received wait indicators and optionally consider the determined load for a decision on scaling the application.

Figure 5A:
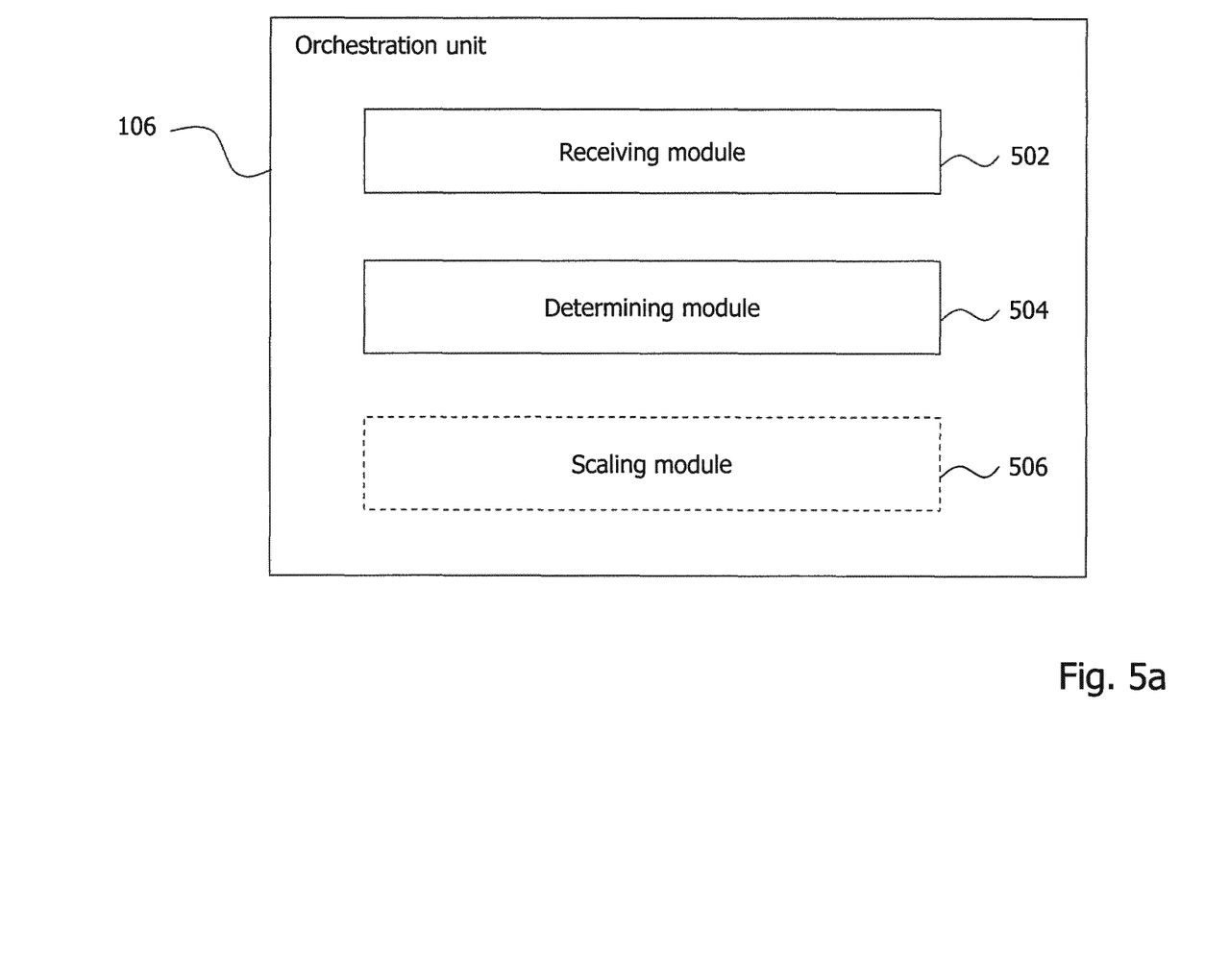
FIGS. 5a and 5b illustrate a modular composition of an orchestration unit and a corresponding method embodiment which may be performed by the orchestration unit according to the present disclosure.
Figure 5B:
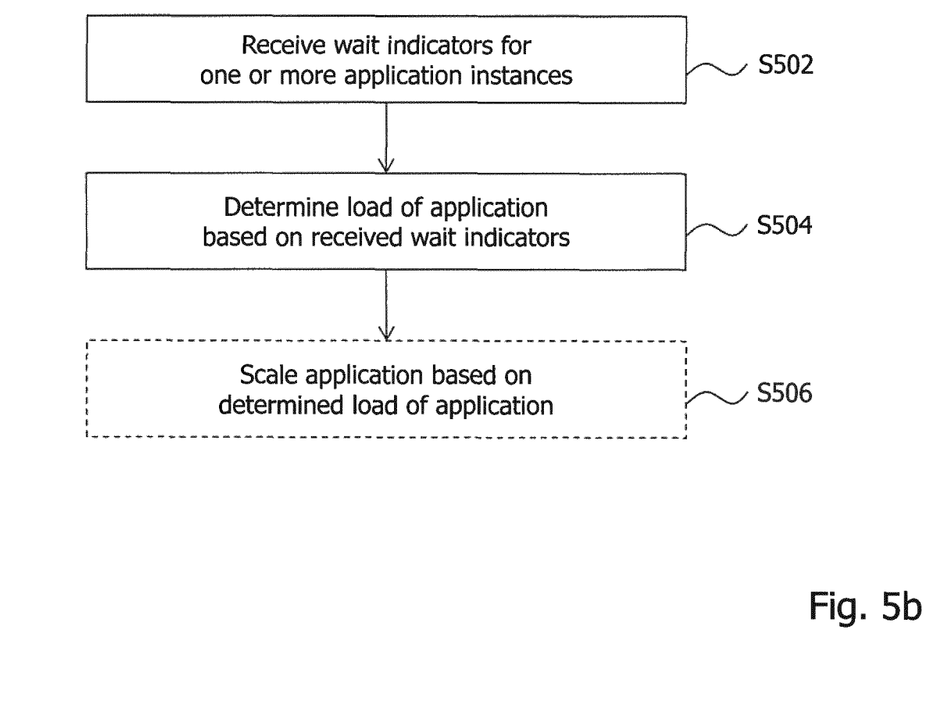

FIG. 5a schematically illustrates an exemplary modular composition of the orchestration unit 106 and FIG. 5b illustrates a corresponding method embodiment which may be performed by the orchestration unit 106 according to the present disclosure. The basic operation of the orchestration unit 106 will be described in the following with reference to both FIGS. 5a and 5b.

In step S502, a receiving module 502 of the orchestration unit 106 receives a wait indicator for each of the application instances 102 and, in step S504, a determining module 504 of the orchestration unit 106 determines the load of the application based on the received wait indicators. The received wait indicators may be used to determine the load of the application in various ways. In one implementation, the determining module 504 may aggregate the received wait indicators to form an aggregated wait indicator, wherein the aggregated wait indicator may be taken as the load of the application. In some variants, particularly if the application instances are obtaining input data at substantially equal input rates, the aggregated indicator may be calculated by taking an average, median, or the like, of the received wait indicators. It will be understood that other metrics may be considered as well for determining the load of the application. For example, it may be conceivable to take into account a wait indicator based metric according to the present disclosure in combination with a metric known from the prior art.

Once determined, the load of the application may be considered by the orchestration unit 106 in a decision on scaling the application. Accordingly, in an optional step S506, a scaling module 506 of the orchestration unit 106 may scale out or scale in the application based on the determined load of the application. The scaling decision may be based on comparing the load of the application with a predetermined threshold, for example. In one implementation, the application may be scaled out if the determined load of the application is greater than a first predetermined threshold and the application may be scaled in if the determined load of the application is less than a second predetermined threshold. In this case, the first predetermined threshold may be greater than the second predetermined threshold. By selecting the thresholds accordingly, the utilization range of the application instances 102 may be tuned as appropriate.

If the application is part of an application chain, other applications in the chain may be scaled as well. In one implementation, the scaling module 506 may scale out or scale in a subsequent application in the application chain based on the determined load of the application.

If the application is a stateful application, the application instances 102 may receive input data according to continuous data flows each. If the wait indicators for the application instances 102 indicate in this case that the distribution of the flows does not provide a substantially equal load for the application instances 102, the scaling module 506 may vary an allocation of input data to the input queues 104 based on the determined load of the application so as to reach a more equal load distribution among the application instances 102.

Figure 6A:
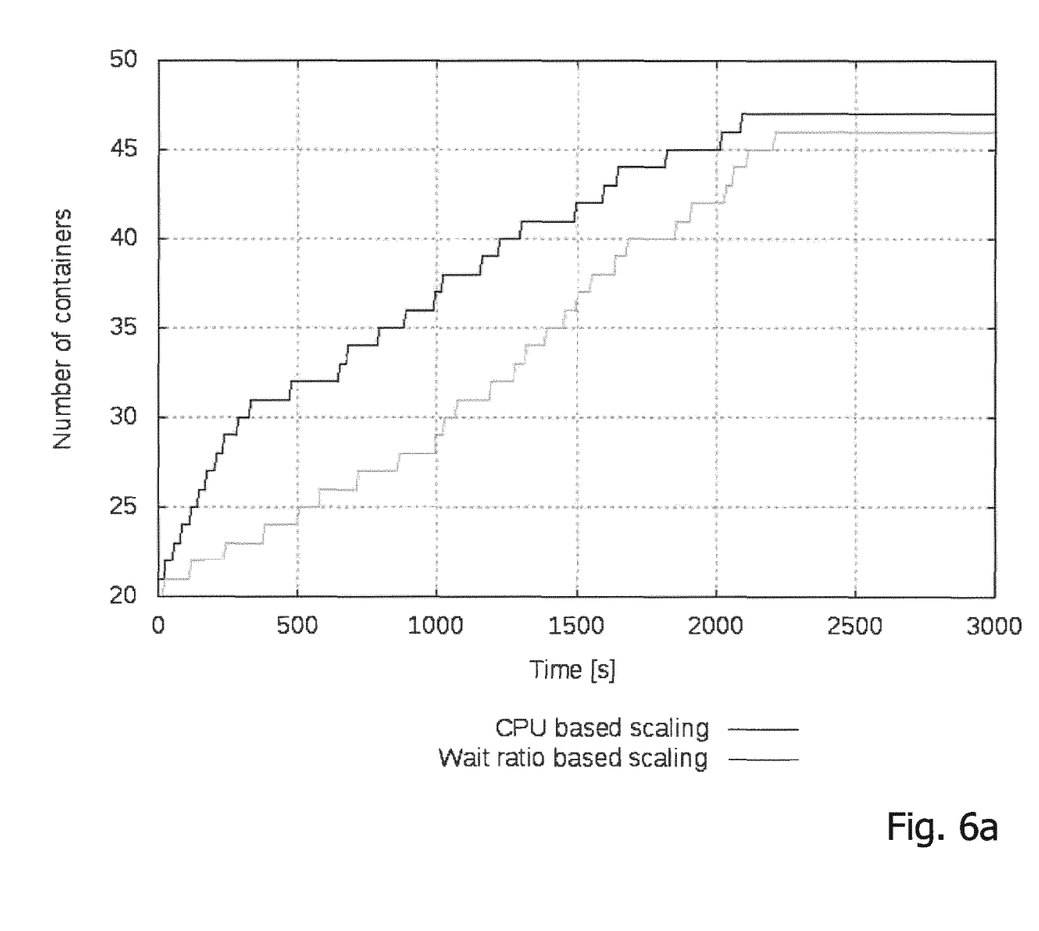
FIGS. 6a and 6b illustrate experimental results of scaling an application according to the technique of the present disclosure in comparison to scaling an application according to a CPU utilization based metric.
Figure 6B:
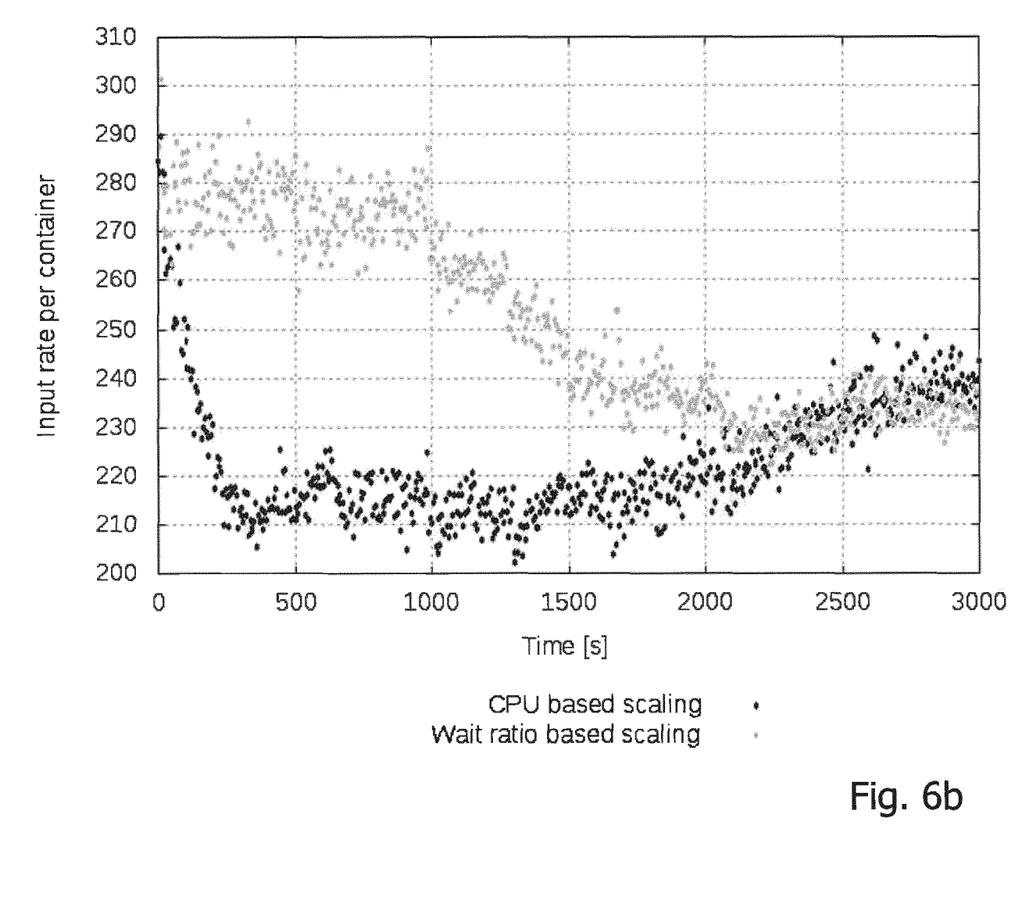

FIGS. 6a and 6b illustrate experimental results of scaling an application according to the technique of the present disclosure in comparison to scaling an application according to a CPU utilization based metric.

In the underlying test, the technique of the present disclosure has been applied in a Platform as a Service (PaaS) type of environment. The platform used was the Ark Analytics Platform of Ericsson Research, wherein the technique of the present disclosure was applied to a typical auto-scale application. A CPU utilization based scaling algorithm was implemented to compare the accumulated resource usage of both the algorithm of the present technique (in accordance with the variant shown in FIG. 4) and the CPU utilization based algorithm. In both cases, threshold based scaling schemes were used with the same parameters.

FIG. 6a shows how the application was scaled out while the input data rate was constantly growing. As may be seen, both scaling algorithms reach the boundaries of the system, i.e., a maximum number of containers (i.e., instances), at roughly the same point in time. However, it can be seen that the algorithm of the present technique steadily uses less containers before reaching this point. The technique of the present disclosure thus achieves a decreased overall resource usage.

FIG. 6b shows the effective container performance recorded during the experiment. As may be seen, the input data rate handled per container is constantly higher using the algorithm of the present technique before both scaling algorithms reach the boundaries of the system at roughly the same point in time. The technique of the present disclosure thus also achieves a more effective container performance in general.

As has become apparent from the above embodiments, the present disclosure provides a technique for determining the current load of an application. The technique may generally be based on input queue monitoring, but may avoid directly querying the length of the input queues. Instead, the technique relies on a simple relation or ratio between empty states and non-empty states of the queue which may be applied independently from the type of the queue. The technique may generally be simple to adopt for different application types, including both stateful and stateless applications.

When wait and input counters are used, the performance overhead of the present technique may be nearly negligible. If the wait counter is to be incremented, execution of the application instance may be on hold because the instance may have to wait for the next input data element anyway. The effective overhead may thus be limited to the time needed for maintaining the input counter only. An input counter may in fact be maintained by the application already and may in this case simply be reused.

The metric provided by the present technique can be used for scaling an application in cases where other scaling approaches, such as CPU utilization based scaling or those based on predefined input rates, fail. Improved scaling may lead to decreased overall resource usage and, as a consequence, to reduced operational costs of the overall system. The metric may further be used to indicate whether the distribution of input data is not optimal between instances of a stateful application, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for supporting determination of a load of an application in a cloud computing environment, the application being executed with one or more application instances in the cloud computing environment, wherein each of the one or more application instances obtains input data from a respective input queue, the method comprising:
determining a wait indicator for at least one of the one or more application instances executed on one or more computing units of the cloud computing environment, wherein the wait indicator for an application instance indicates a ratio between times at which the input queue of the application instance is in an empty state and times at which the input queue of the application instance is in a non-empty state; and
triggering forwarding of the wait indicator determined for the at least one of the one or more application instances to a load determination component, wherein the wait indicator includes a low wait value and a high wait value, and wherein the high wait value indicates that the application instance frequently waits for the input data.

2. The method of claim 1, wherein determining the wait indicator for the application instance comprises:
incrementing a wait counter each time a dequeuing operation performed on the input queue of the application instance fails as the input queue of the application instance is in the empty state; and
incrementing an input counter each time a dequeuing operation performed on the input queue of the application instance succeeds as the input queue of the application instance is in the non-empty state, and
wherein the wait indicator for the application instance indicates a ratio between the wait counter and the input counter.

3. The method of claim 1, wherein determining the wait indicator for the application instance is performed by the application instance itself.

4. The method of claim 1:
wherein the at least one of the one or more application instances obtains the input data from the respective input queue via an interface component; and
wherein the determining the wait indicator for the at least one of the one or more application instances is performed by the interface component.

5. A method for determining a load of an application in a cloud computing environment, the application being executed with one or more application instances in the cloud computing environment, wherein each of the one or more application instances obtains input data from a respective input queue, the method comprising:
receiving a wait indicator for each of the one or more application instances executed on one or more computing units of the cloud computing environment, wherein the wait indicator for an application instance indicates a ratio between times at which the input queue of the application instance is in an empty state and times at which the input queue of the application instance is in a non-empty state; and
determining the load of the application based on the received wait indicator for each of the one or more application instances, wherein the wait indicator includes a low wait value and a high wait value, and wherein the high wait value indicates that the application instance frequently waits for the input data.

6. The method of claim 5:
wherein the determining the load of the application includes aggregating the received wait indicator for each of the one or more application instances to form an aggregated wait indicator; and
wherein the aggregated wait indicator indicates the load of the application.

7. The method of claim 5, further comprising scaling out or scaling in the application based on the determined load of the application.

8. The method of claim 7:
wherein the application is scaled out if the determined load of the application is greater than a first predetermined threshold; and
wherein the application is scaled in if the determined load of the application is less than a second predetermined threshold.

9. The method of claim 5:
wherein the application is part of an application chain; and
wherein the method further comprises scaling out or scaling in a subsequent application in the application chain based on the determined load of the application.

10. The method of claim 5, further comprising varying an allocation of the input data to the respective input queues based on the determined load of the application.

11. A computing unit for supporting determination of a load of an application in a cloud computing environment, the application being executed with one or more application instances in the cloud computing environment, wherein each of the one or more application instances obtains input data from a respective input queue, the computing unit comprising:
processing circuitry; and
memory containing instructions executable by the processing circuitry whereby the computing unit is operative to:
determine a wait indicator for at least one of the one or more application instances executed on the computing unit of the cloud computing environment, wherein the wait indicator for an application instance indicates a ratio between times at which the input queue of the application instance is in an empty state and times at which the input queue of the application instance is in a non-empty state; and
trigger forwarding of the wait indicator determined for the at least one of the one or more application instances to a load determination component, wherein the wait indicator includes a low wait value and a high wait value, and wherein the high wait value indicates that the application instance frequently waits for the input data.

12. The computing unit of claim 11, wherein to determine the wait indicator for the application instance, the computing unit is operative to:
increment a wait counter each time a dequeuing operation performed on the input queue of the application instance fails as the input queue of the application instance is in the empty state; and
increment an input counter each time a dequeuing operation performed on the input queue of the application instance succeeds as the input queue of the application instance is in the non-empty state, and
wherein the wait indicator for the application instance indicates a ratio between the wait counter and the input counter.

13. The computing unit of claim 11:
wherein the at least one of the one or more application instances obtains the input data from the respective input queue via an interface component; and
wherein the determination of the wait indicator for the at least one of the one or more application instances is performed by the interface component.

14. An orchestration unit for determining a load of an application in a cloud computing environment, the application being executed with one or more application instances in the cloud computing environment, wherein each of the one or more application instances obtains input data from a respective input queue, the orchestration unit comprising:
processing circuitry; and
memory containing instructions executable by the processing circuitry whereby the orchestration unit is operative to:
receive a wait indicator for each of the one or more application instances executed on one or more computing units of the cloud computing environment, wherein the wait indicator for an application instance indicates a ratio between times at which the input queue of the application instance is in an empty state and times at which the input queue of the application instance is in a non-empty state; and
determine the load of the application based on the received wait indicator for each of the one or more application instances, wherein the wait indicator includes a low wait value and a high wait value, and wherein the high wait value indicates that the application instance frequently waits for the input data.

15. The orchestration unit of claim 14:
wherein to determine the load of the application, the instructions are such that the orchestration unit is operative to aggregate the received wait indicator for each of the one or more application instances to form an aggregated wait indicator; and
wherein the aggregated wait indicator indicates the load of the application.

16. The orchestration unit of claim 14, wherein the instructions are such that the orchestration unit is operative to scale out or scale in the application based on the determined load of the application.

* * * * *